(12) United States Patent
Seo et al.

(10) Patent No.: US 8,532,461 B2
(45) Date of Patent: Sep. 10, 2013

(54) RECORDING MEDIUM HAVING DATA STRUCTURE FOR MANAGING REPRODUCTION OF STILL PICTURES RECORDED THEREON AND RECORDING AND REPRODUCING METHODS AND APPARATUSES

(75) Inventors: Kang Soo Seo, Kyunggi-do (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 861 days.

(21) Appl. No.: 12/656,133

(22) Filed: Jan. 19, 2010

(65) Prior Publication Data

US 2010/0124406 A1     May 20, 2010

Related U.S. Application Data

(62) Division of application No. 10/759,425, filed on Jan. 20, 2004, now Pat. No. 7,684,675.

(60) Provisional application No. 60/445,425, filed on Feb. 7, 2003.

(30) Foreign Application Priority Data

| Jan. 20, 2003 | (KR) | 10-2003-003784 |
| Feb. 14, 2003 | (KR) | 10-2003-009485 |

(51) Int. Cl.
*H04N 9/80* (2006.01)

(52) U.S. Cl.
USPC .................................................. 386/241

(58) Field of Classification Search
USPC ................................................. 386/200, 241
See application file for complete search history.

(56) References Cited

U.S. PATENT DOCUMENTS

| 4,164,760 A | 8/1979 | Inaba et al. |
| 5,854,873 A | 12/1998 | Mori et al. |
| 5,870,523 A | 2/1999 | Kikuchi et al. |
| 5,884,004 A | 3/1999 | Sato et al. |
| 5,907,658 A | 5/1999 | Murase et al. |
| 5,999,698 A | 12/1999 | Nakai et al. |
| 6,064,379 A | 5/2000 | DeMoney |
| 6,122,436 A | 9/2000 | Okada et al. |

(Continued)

FOREIGN PATENT DOCUMENTS

| AU | 6672298 | 9/1998 |
| AU | 2003/282415 | 11/2003 |

(Continued)

OTHER PUBLICATIONS

"Information technology-Generic coding of moving pictures and associated audio information: Systems", International Standard, XP-002483354, Second edition Dec. 1, 2000.

(Continued)

*Primary Examiner* — Huy T Nguyen
(74) *Attorney, Agent, or Firm* — Harness, Dickey & Pierce, P.L.C.

(57) ABSTRACT

The recording medium includes a data structure with at least one playlist stored in a playlist area of the recording medium. The playlist includes at least one playitem and at least one sub-playitem. The playitem provides navigation information for reproducing at least one still picture from a first file, and the sub-playitem provides navigation information for reproducing audio data from a second file.

15 Claims, 12 Drawing Sheets

(56) References Cited

U.S. PATENT DOCUMENTS

| | | |
|---|---|---|
| 6,148,138 A | 11/2000 | Sawabe et al. |
| 6,157,769 A | 12/2000 | Yoshimura et al. |
| 6,250,928 B1 | 6/2001 | Poggio et al. |
| 6,266,483 B1 | 7/2001 | Okada et al. |
| 6,285,826 B1 | 9/2001 | Murase et al. |
| 6,308,005 B1 | 10/2001 | Ando et al. |
| 6,341,196 B1 | 1/2002 | Ando et al. |
| 6,353,702 B1 | 3/2002 | Ando et al. |
| 6,369,835 B1 | 4/2002 | Lin |
| 6,374,037 B1 | 4/2002 | Okada et al. |
| 6,385,389 B1 | 5/2002 | Maruyama et al. |
| 6,393,430 B1 | 5/2002 | Van Ryzin |
| 6,400,893 B1 | 6/2002 | Murase et al. |
| 6,424,797 B1 | 7/2002 | Murase et al. |
| 6,442,337 B1 | 8/2002 | Okada et al. |
| 6,470,460 B1 | 10/2002 | Kashiwagi et al. |
| 6,493,504 B1 | 12/2002 | Date et al. |
| 6,529,683 B2 | 3/2003 | Mori et al. |
| 6,532,335 B2 | 3/2003 | Otomo et al. |
| 6,574,419 B1 | 6/2003 | Nonomura et al. |
| 6,580,870 B1 | 6/2003 | Kanazawa et al. |
| 6,594,442 B1 | 7/2003 | Kageyama et al. |
| 6,748,415 B1 | 6/2004 | Sugimoto |
| 6,771,891 B1 | 8/2004 | Moon |
| 6,798,976 B2 | 9/2004 | Tsumagari et al. |
| 6,816,189 B2 | 11/2004 | Nagaoka et al. |
| 6,823,010 B1 | 11/2004 | Curet et al. |
| 6,829,211 B2 | 12/2004 | Sako et al. |
| 6,856,756 B1 | 2/2005 | Mochizuki et al. |
| 6,919,925 B2 | 7/2005 | Kudo |
| 6,943,684 B2 | 9/2005 | Berry |
| 6,975,363 B1 | 12/2005 | Baldwin et al. |
| 6,992,710 B2 | 1/2006 | Nagaoka |
| 6,999,674 B1 | 2/2006 | Hamada et al. |
| 7,054,545 B2 | 5/2006 | Ando et al. |
| 7,158,175 B2 | 1/2007 | Belz et al. |
| 7,224,890 B2 | 5/2007 | Kato |
| 7,343,052 B2 | 3/2008 | Roth et al. |
| 7,684,675 B2 * | 3/2010 | Seo et al. .................. 386/248 |
| 2001/0000809 A1 | 5/2001 | Ando et al. |
| 2001/0016112 A1 | 8/2001 | Heo et al. |
| 2001/0017975 A1 | 8/2001 | Ando et al. |
| 2001/0043790 A1 | 11/2001 | Saeki et al. |
| 2001/0046371 A1 | 11/2001 | Ando et al. |
| 2001/0056580 A1 | 12/2001 | Seo et al. |
| 2002/0006165 A1 | 1/2002 | Kato |
| 2002/0025143 A1 | 2/2002 | Kashiwagi et al. |
| 2002/0035575 A1 | 3/2002 | Taira et al. |
| 2002/0048228 A1 | 4/2002 | Sako et al. |
| 2002/0085022 A1 | 7/2002 | Masuda et al. |
| 2002/0110369 A1 | 8/2002 | Mori et al. |
| 2002/0126994 A1 | 9/2002 | Gunji et al. |
| 2002/0127001 A1 | 9/2002 | Gunji et al. |
| 2002/0130896 A1 | 9/2002 | Spence et al. |
| 2002/0135607 A1 | 9/2002 | Kato et al. |
| 2002/0135608 A1 | 9/2002 | Hamada et al. |
| 2002/0145702 A1 | 10/2002 | Kato et al. |
| 2002/0164152 A1 | 11/2002 | Kato et al. |
| 2002/0172496 A1 | 11/2002 | Gunji et al. |
| 2002/0176695 A1 | 11/2002 | Sawabe et al. |
| 2003/0014760 A1 | 1/2003 | Yamauchi et al. |
| 2003/0138238 A1 | 7/2003 | Kashiwagi et al. |
| 2003/0165328 A1 | 9/2003 | Grecia |
| 2003/0235406 A1 | 12/2003 | Seo et al. |
| 2004/0001704 A1 | 1/2004 | Chan et al. |
| 2004/0047607 A1 | 3/2004 | Seo et al. |
| 2004/0057700 A1 | 3/2004 | Okada et al. |
| 2004/0081434 A1 | 4/2004 | Jung et al. |
| 2004/0141436 A1 | 7/2004 | Monahan |
| 2004/0179820 A1 | 9/2004 | Kashiwagi et al. |
| 2004/0184780 A1 | 9/2004 | Seo et al. |
| 2004/0213552 A1 | 10/2004 | Kato |
| 2005/0019007 A1 | 1/2005 | Kato et al. |
| 2005/0025461 A1 | 2/2005 | Kato et al. |
| 2005/0066352 A1 | 3/2005 | Herley |
| 2005/0078948 A1 | 4/2005 | Yoo et al. |
| 2005/0105888 A1 | 5/2005 | Hamada et al. |
| 2005/0163463 A1 | 7/2005 | Schick et al. |
| 2005/0196143 A1 | 9/2005 | Kato et al. |
| 2005/0201718 A1 | 9/2005 | Kato |
| 2005/0254363 A1 | 11/2005 | Hamada et al. |
| 2006/0036960 A1 | 2/2006 | Loui |
| 2006/0188223 A1 | 8/2006 | Ikeda et al. |
| 2006/0195633 A1 | 8/2006 | Plourde, Jr. |
| 2006/0288302 A1 | 12/2006 | Yahata et al. |
| 2008/0166067 A1 | 7/2008 | Roth et al. |

FOREIGN PATENT DOCUMENTS

| | | |
|---|---|---|
| CN | 1205503 | 1/1999 |
| CN | 1240293 | 1/2000 |
| CN | 1244710 | 2/2000 |
| CN | 1245956 A | 3/2000 |
| CN | 1245957 A | 3/2000 |
| CN | 1263672 | 8/2000 |
| CN | 1063863 | 3/2001 |
| CN | 1300022 | 6/2001 |
| CN | 1301445 | 6/2001 |
| CN | 1303094 | 7/2001 |
| CN | 1304533 | 7/2001 |
| CN | 1357888 | 7/2002 |
| CN | 1381137 | 11/2002 |
| DE | 69907758 | 2/2004 |
| DE | 60002774 | 3/2004 |
| EP | 0 737 980 | 10/1996 |
| EP | 0 856 849 | 8/1998 |
| EP | 0 978 994 | 2/2000 |
| EP | 1003337 | 5/2000 |
| EP | 1 045 393 | 10/2000 |
| EP | 0 949 825 | 11/2000 |
| EP | 1 056 094 A1 | 11/2000 |
| EP | 1056092 | 11/2000 |
| EP | 1 103 974 | 5/2001 |
| EP | 1102270 | 5/2001 |
| EP | 1 113 439 | 7/2001 |
| EP | 1128386 | 8/2001 |
| EP | 0 942 609 | 10/2001 |
| EP | 1198133 | 4/2002 |
| EP | 1286544 | 2/2003 |
| EP | 1 300 851 | 4/2003 |
| EP | 1 041 566 | 5/2003 |
| EP | 1 204 269 | 11/2003 |
| FR | 2 581 771 | 11/1986 |
| GB | 2 119 151 | 11/1983 |
| GB | 2 359 210 A | 8/2001 |
| JP | 1300777 | 12/1989 |
| JP | 5137114 A | 6/1993 |
| JP | 6311481 | 11/1994 |
| JP | 07-057436 | 3/1995 |
| JP | 07-262646 | 10/1995 |
| JP | 09-017101 | 1/1997 |
| JP | 09-252450 | 9/1997 |
| JP | 09-261584 | 10/1997 |
| JP | 10-154373 | 6/1998 |
| JP | 11-213628 | 8/1999 |
| JP | 2000-004421 | 1/2000 |
| JP | 2000-20554 | 1/2000 |
| JP | 2000-041212 | 2/2000 |
| JP | 2000-59714 | 2/2000 |
| JP | 2000-251402 | 9/2000 |
| JP | 2000-268537 A | 9/2000 |
| JP | 2000-333126 | 11/2000 |
| JP | 2001-052467 | 2/2001 |
| JP | 2001-069460 | 3/2001 |
| JP | 2001-086458 | 3/2001 |
| JP | 2001078123 | 3/2001 |
| JP | 2001103417 | 4/2001 |
| JP | 2001-155466 | 6/2001 |
| JP | 2001-157155 | 6/2001 |
| JP | 2001-167529 | 6/2001 |
| JP | 2001-216739 | 8/2001 |

| | | |
|---|---|---|
| JP | 2001-231015 | 8/2001 |
| JP | 2001-243721 | 9/2001 |
| JP | 2001-285772 | 10/2001 |
| JP | 2002-056651 | 2/2002 |
| JP | 2002-082684 | 3/2002 |
| JP | 2002-157835 | 5/2002 |
| JP | 2002-158965 A | 5/2002 |
| JP | 2002-158972 A | 5/2002 |
| JP | 2002-208258 | 7/2002 |
| JP | 2002-325221 | 11/2002 |
| JP | 2002-354424 | 12/2002 |
| JP | 2003-006979 | 1/2003 |
| JP | 2003-016764 | 1/2003 |
| JP | 2003009090 A | 1/2003 |
| JP | 2003-045154 | 2/2003 |
| JP | 2003-299015 | 10/2003 |
| JP | 2004-336566 | 11/2004 |
| KR | 1998-086030 | 12/1998 |
| KR | 1999-0070106 | 9/1999 |
| KR | 2000-2840 | 1/2000 |
| KR | 2000-0002921 | 1/2000 |
| KR | 2000-0002922 | 1/2000 |
| KR | 2000-14419 | 3/2000 |
| KR | 2000-0018987 | 4/2000 |
| KR | 2001-0013565 | 2/2001 |
| KR | 2001-21485 | 3/2001 |
| KR | 2001-0027114 | 4/2001 |
| KR | 2001-0051295 | 6/2001 |
| KR | 2001-0066211 | 7/2001 |
| KR | 2002-0021402 | 3/2002 |
| KR | 2002-0064463 | 8/2002 |
| KR | 2003-64546 | 8/2003 |
| RU | 2 229 174 C2 | 5/2004 |
| TW | 517495 | 1/2003 |
| WO | WO 98/37699 | 8/1998 |
| WO | WO 99/53694 | 10/1999 |
| WO | WO 00/33532 | 6/2000 |
| WO | WO 00/55857 | 9/2000 |
| WO | WO 00/60598 | 10/2000 |
| WO | WO 01/11626 | 2/2001 |
| WO | WO 01/82608 | 11/2001 |
| WO | WO 01/82609 A1 | 11/2001 |
| WO | WO 02/062061 | 8/2002 |
| WO | WO 2004/023234 | 3/2004 |
| WO | WO 2004/023484 | 3/2004 |
| WO | WO 2004/023485 | 3/2004 |
| WO | WO 2004/066281 | 8/2004 |
| WO | WO 2004/075194 | 9/2004 |
| WO | WO 2004/086396 | 10/2004 |

OTHER PUBLICATIONS

Japanese Patent Office Action dated Sep. 24, 2008 for a counterpart Japanese application.
European Patent Office Search Report dated Jul. 30, 2008 for a counterpart European application.
European Patent Office Search Report dated Sep. 1, 2008 for a counterpart European application.
Chinese Patent Office Action dated Aug. 8, 2008 for a counterpart Chinese application.
Japanese Patent Office Action dated Sep. 16, 2008 for a counterpart Japanese application.
United States Patent Office Action dated Jul. 9, 2008 for U.S. Appl. No. 10/716,611.
Japanese Patent Office Action dated Jun. 20, 2008 for a counterpart Japanese application.
Japanese Patent Office Action dated Jun. 10, 2008 for a counterpart Japanese application.
United States Patent Office Action dated May 29, 2008.
United States Patent Office Action dated Jun. 2, 2008.
Japanese Patent Office Action dated May 20, 2008 for a counterpart Japanese Patent Application.
European Patent Office Action dated May 16, 2008 for a counterpart European Patent Application.
Japanese Patent Office Action for counterpart Japanese Patent applicaton dated Jun. 26, 2007.
Japanese Office Action dated Feb. 16, 2010.
U.S. Office Action dated Jan. 29, 2010.
U.S. Office Action dated Apr. 1, 2010 in U.S. Appl. No. 10/766,239.
Korean Office Action dated May 17, 2010 for Korean Application No. 10-2005-7013392.
Office Action for corresponding Canadian Application No. 2,515,950 dated Jun. 28, 2011.
"Digital Video Broadcasting (DVB); Subtitling Systems," European Telecommunication Standard Institute, European Broadcasting Union, ETS 300-743, Sep. 1997.
US Office Action dated Jul. 31, 2007, issued in Corresponding U.S. Appl. No. 10/759,425.
US Office Action dated Nov. 11, 2009, issued in corresponding U.S. Appl. No. 10/766,239.
US Office Action dated Jul. 2, 2010, issued in corresponding U.S. Appl. No. 10/759,461.
Canadian Office Action dated Oct. 1, 2010, issued in corresponding Application No. CA 2 512 844.

* cited by examiner

RECORDING MEDIUM HAVING DATA STRUCTURE FOR MANAGING REPRODUCTION OF STILL PICTURES RECORDED THEREON AND RECORDING AND REPRODUCING METHODS AND APPARATUSES

PRIORITY

This application is a Divisional of U.S. application Ser. No. 10/759,425, filed on Jan. 20, 2004 now U.S. Pat. No. 7,684,675, which claims priority under 35 U.S.C. 119 on Korean Application No. 10-2003-003784 filed Jan. 20, 2003, Korean Application No. 10-2003-009485 filed Feb. 14, 2003 and U.S. Provisional Application No. 60/445,425 filed Feb. 7, 2003; the contents of all of which are incorporated by reference in their entirety.

BACKGROUND OF THE INVENTION

1. Field of the Invention

The present invention relates to a recording medium having a data structure for managing reproduction of at least still pictures recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available in the near future. The Blu-ray Disc Rewritable (BD-RE) and Blu-ray Disk ROM (BD-ROM) are examples of these new optical disks.

While the standard for BD-RE has been published, the standardization for high-density read-only optical disks such as the Blu-ray ROM (BD-ROM) is still under way. Consequently, an effective data structure for managing reproduction of still pictures recorded on the high-density read-only optical disk such as a BD-ROM is not yet available.

SUMMARY OF THE INVENTION

The recording medium according to the present invention includes a data structure for managing reproduction of at least still pictures recorded on the recording medium.

In one exemplary embodiment, a playlist area of the recording medium stores at least one playlist. The playlist includes at least one playitem and at least one sub-playitem. The playitem provides navigation information for reproducing at least one still picture from a first file, and the sub-playitem provides navigation information for reproducing audio data from a second file.

In another exemplary embodiment, the recording medium further includes a data area storing the first and second files. In this embodiment, the first file includes at least one still picture and related data associated with the still picture. Here, the related data may include graphics data, subtitle data, etc.

In a further exemplary embodiment, the playitem provides navigation information for reproducing presentation data from the first file, where the presentation data includes at least the still picture and related data associated with the still picture. In this embodiment, the presentation data may be divided into still picture units such that each still picture unit includes at least one still picture and associated related data.

In a still further exemplary embodiment, the still picture and related data are multiplexed into a transport stream on a still picture unit by still picture unit basis. In this embodiment, each elementary stream of the still picture and related data may be aligned within the still picture unit. As an example, each elementary stream is a packetized elementary stream.

In another exemplary embodiment, a playlist area of the recording medium stores at least one playlist including at least one playitem and at least one sub-playitem. The playitem provides navigation information for reproducing at least one still picture from a first data stream, and the sub-playitem file provides navigation information for reproducing an audio stream separate from the first data stream.

The present invention further provides apparatuses and methods for recording and reproducing the data structure according to the present invention, and recording and reproducing slide shows according to the present invention.

BRIEF DESCRIPTION OF THE DRAWINGS

The above features and other advantages of the present invention will be more clearly understood from the following detailed description taken in conjunction with the accompanying drawings, in which.

DESCRIPTION OF THE EMBODIMENTS

In order that the invention may be fully understood, exemplary embodiments thereof will now be described with reference to the accompanying drawings.

Figure 1:
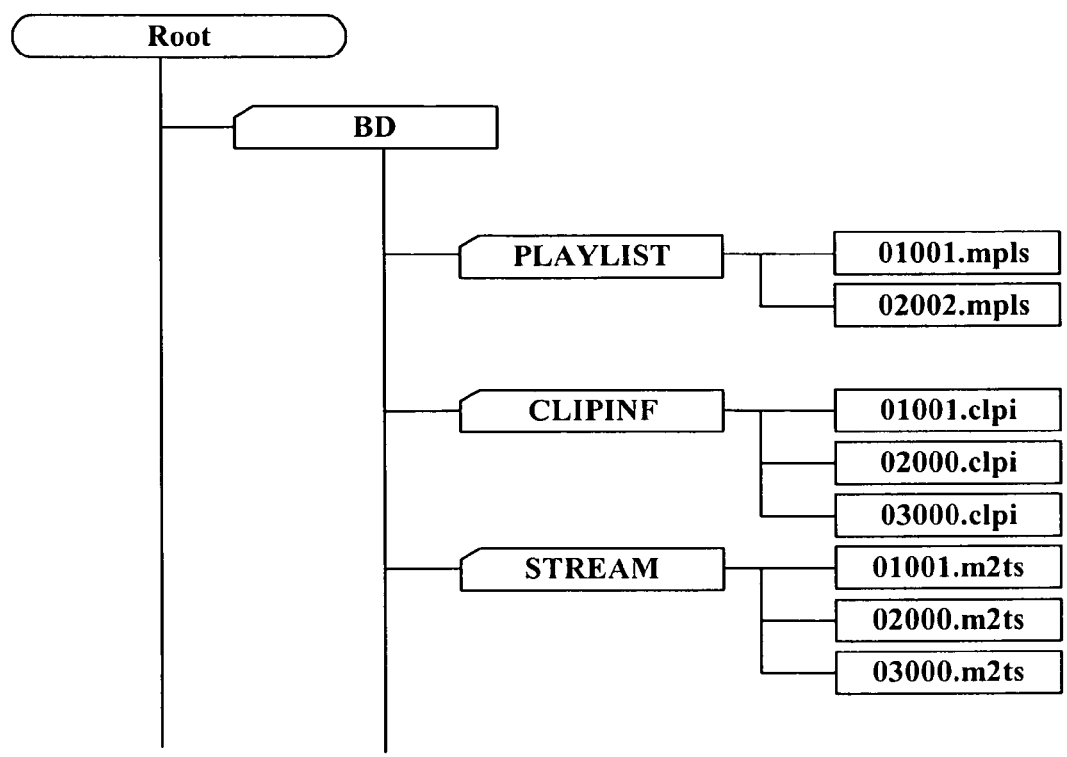
FIG. 1 illustrates an exemplary embodiment of a recording medium file or data structure according to the present invention.

A high-density recording medium such as a high density optical disk, for example, a Blu-Ray ROM (BD-ROM), BD-RE, etc. in accordance with the invention may have a file or data structure for managing reproduction of video and audio data as shown in FIG. 1. Some aspects of the data structure according to the present invention shown in FIG. 1 are the same as the well-known BD-RE standard, as such these aspects will be reviewed, but not described in great detail.

As shown in FIG. 1, the root directory contains at least one BD directory. The BD directory includes general files (not shown), a PLAYLIST directory in which playlist files (e.g., *.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clip streams files or just clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip file (e.g., presentation time stamps on an ATC or STC basis). The playlist file may also include sub-playitems that also provide a pair of IN-point and OUT-point that point to positions on a time axis of a clip file. Expressed another way, the playlist file identifies playitems and sub-playitems, each playitem or sub-playitem points to a clip file or portion thereof and identifies the clip information file associated with the clip file. The clip information file is used, among other things, to map the playitems to the clip file of source packets. Playlists may also include playlist marks which point to specific places (e.g., a specific address) in a clip file The general information files (not shown) provide general information for managing the reproduction of the A/V streams recorded on the optical disk.

Figure 2:
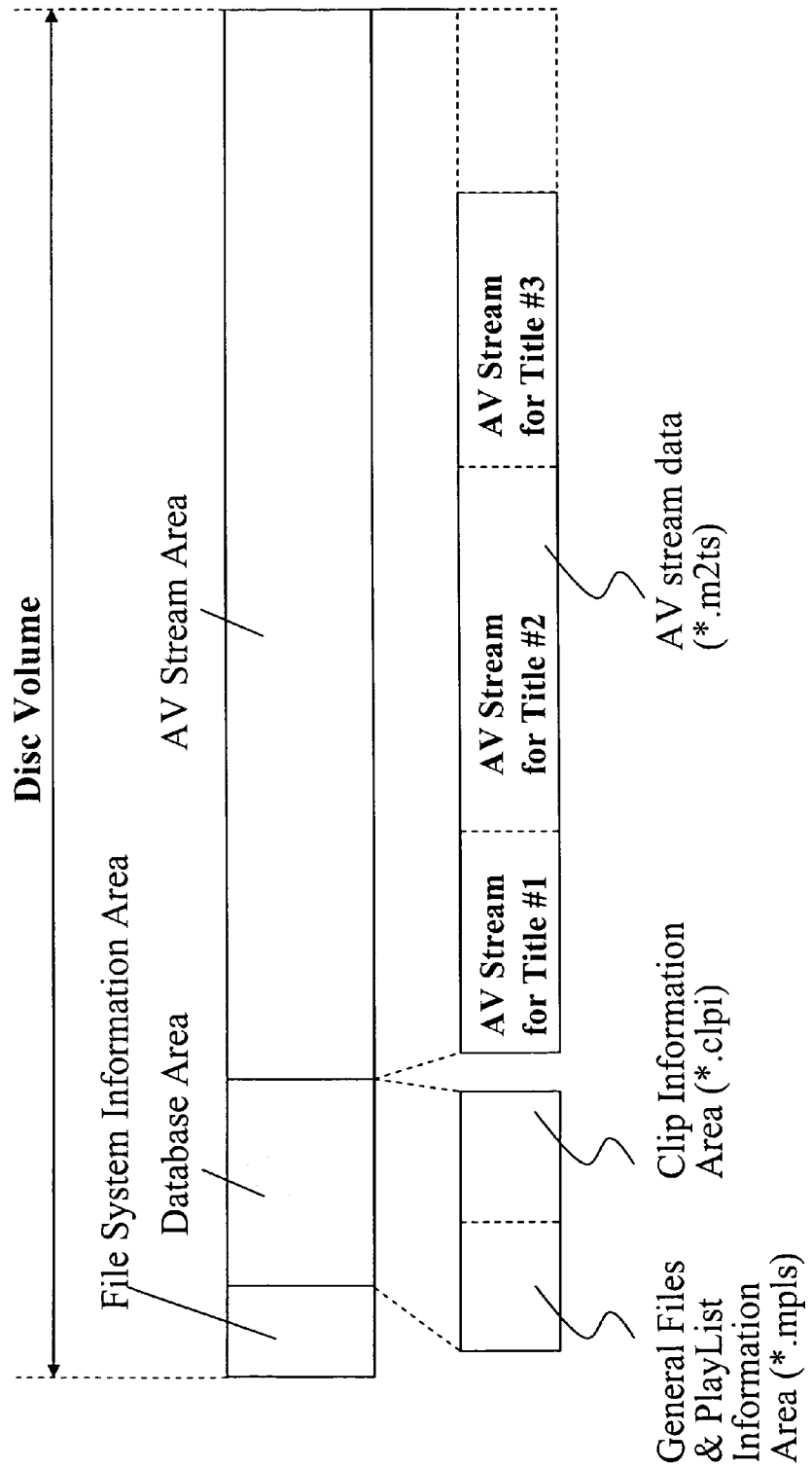
FIG. 2 illustrates an example of a recording medium having the data structure of FIG. 1 stored thereon.

In addition to illustrating the data structure of the recording medium according to an embodiment of the present invention, FIG. 1 represents the areas of the recording medium. For example, the general information files are recorded in one or more general information areas, the playlist directory is recorded in one or more playlist directory areas, each playlist in a playlist directory is recorded in one or more playlist areas of the recording medium, etc. FIG. 2 illustrates an example of a recording medium having the data structure of FIG. 1 stored thereon. As shown, the recording medium includes a file system information area, a data base area and an A/V stream area. The data base area includes a general information file and playlist information area and a clip information area. The general information file and playlist information area have the general information files recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data.

Because of the large storage capacity of the newer, high-density recording media such as BD-ROM still images or pictures may be recorded and reproduced in an organized and/or user interactive fashion, for example, as slideshows. The data structure for managing reproduction of still pictures for a high-density recording medium in accordance with embodiments of the present invention will be described along with methods and apparatuses according to embodiments of the present invention for recording and reproducing still images.

Figure 3:
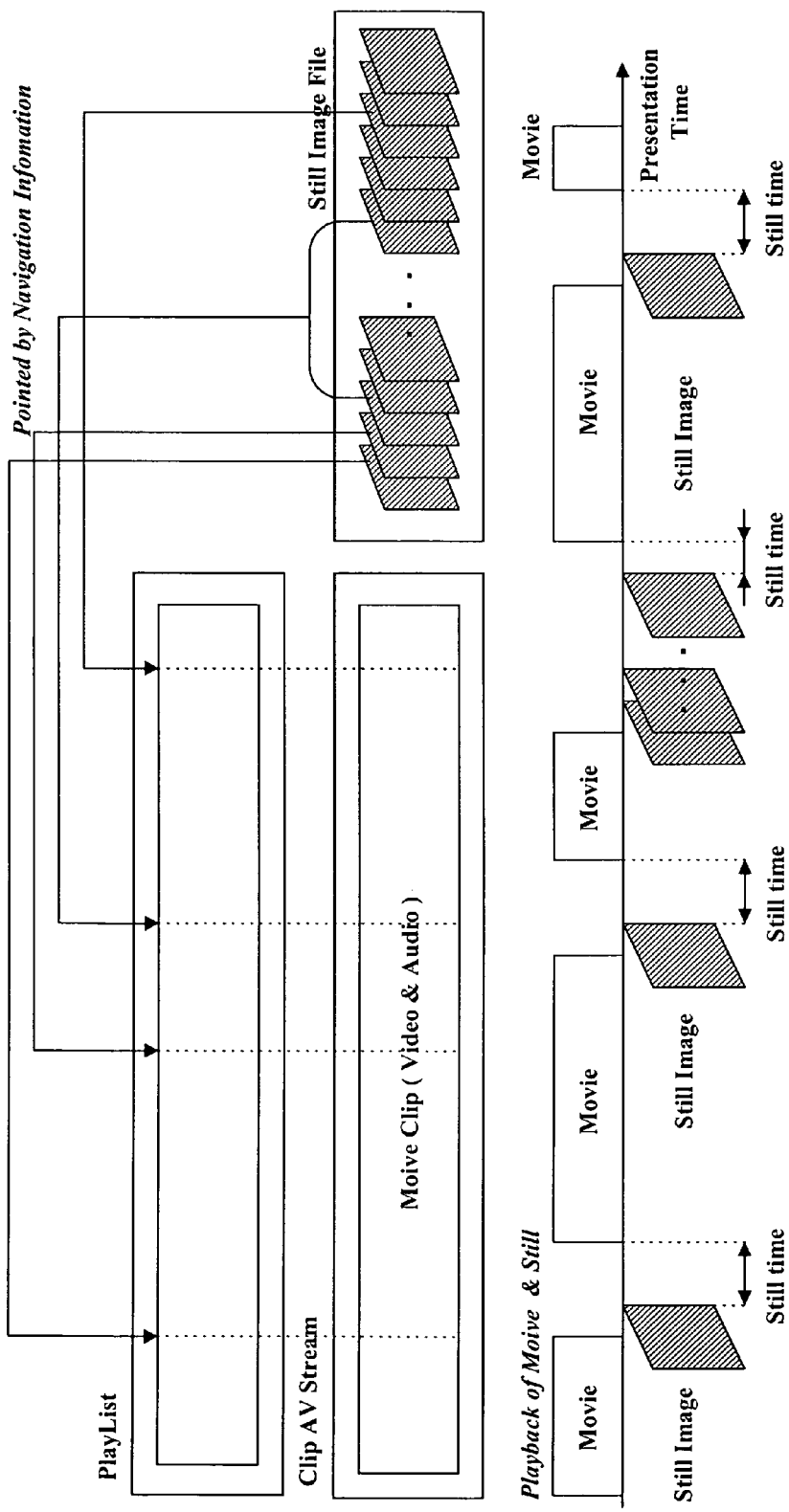
FIG. 3 illustrates a detailed embodiment of portions of the data structure in FIG. 1 and method of managing still images for a high-density recording medium.

FIG. 3 illustrates an embodiment of a data structure and method of managing still images for a high-density recording medium in accordance with the invention. A plurality of still images or pictures are stored in an individual still image file on a high-density recording medium, such as a BD-ROM, and a playlist includes navigation information for playback control of the still images.

The navigation information of the playlist is also associated with movie video or audio data recorded in a particular area of a clip A/V stream. The playlist indicates at what points in the movie video or audio data to reproduce a still picture. Namely, the playlist links the clip A/V stream with the still image file. The playlist may also provide a duration for displaying each still picture, or this information may be supplied by a clip information file. The duration may be finite or infinite.

When, based on reproduction of the playlist, a reproducing apparatus finds that a still image is associated with movie video or audio data during reproduction of the movie video or audio data, the reproducing apparatus obtains the still image from the still image file. The reproducing apparatus then performs a still operation to display the still image for a limited duration or indefinitely based on the presentation duration information for the still image. When an indefinite duration is indicated, the still picture is displayed until user input is received.

As will be appreciated from the above and following disclosure, still images may be displayed as a sequential slideshow, a random/shuffle slideshow, or a browsable slideshow. A sequential slideshow involves the reproduction of still images having limited duration in the order set forth by the playlist. This reproduction of the still images may also occur in synchronized reproduction with audio data. A browsable slide show involves reproduction of still images having infinite duration in an order set forth by the playlist. Reproduction proceeds to a previous or subsequent still image based on user input. A random/shuffle slideshow is a form of sequential or browsable slideshow in which the order to reproduce the still images is randomized.

Figure 4:
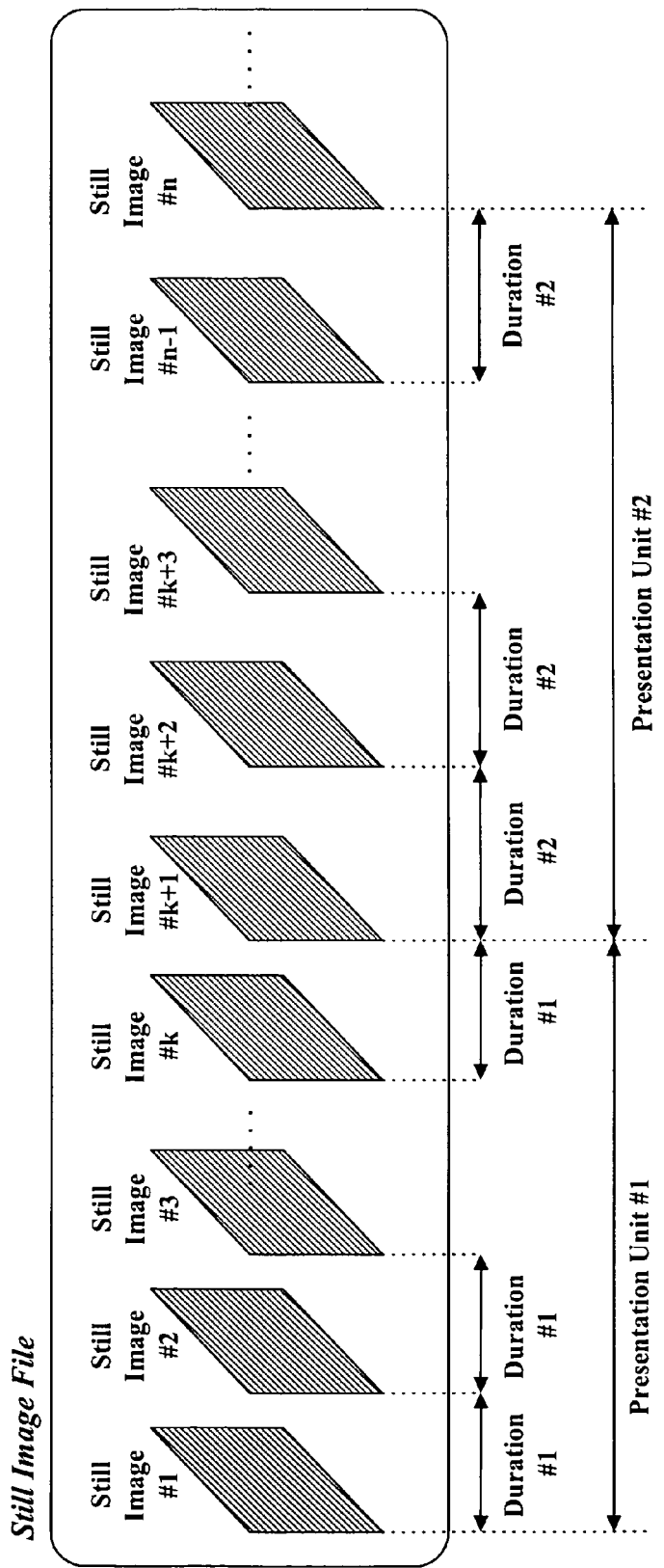
FIG. 4 illustrates one example of a still image file.

FIG. 4 illustrates one example of a still image file. In this example, a still image or a group of still images form a presentation unit. A presentation unit may be formed, for example, of still images having a common presentation attribute. For example in FIG. 4, still images #1 ~#k that have the same presentation duration (duration #1) are grouped into presentation unit #1 and still images #k+1~#n that have the same presentation duration (duration #2) are grouped into presentation unit #2. While duration has been given as an example of a presentation attribute, it will be understood that the present invention is not limited to this example.

Figure 5:
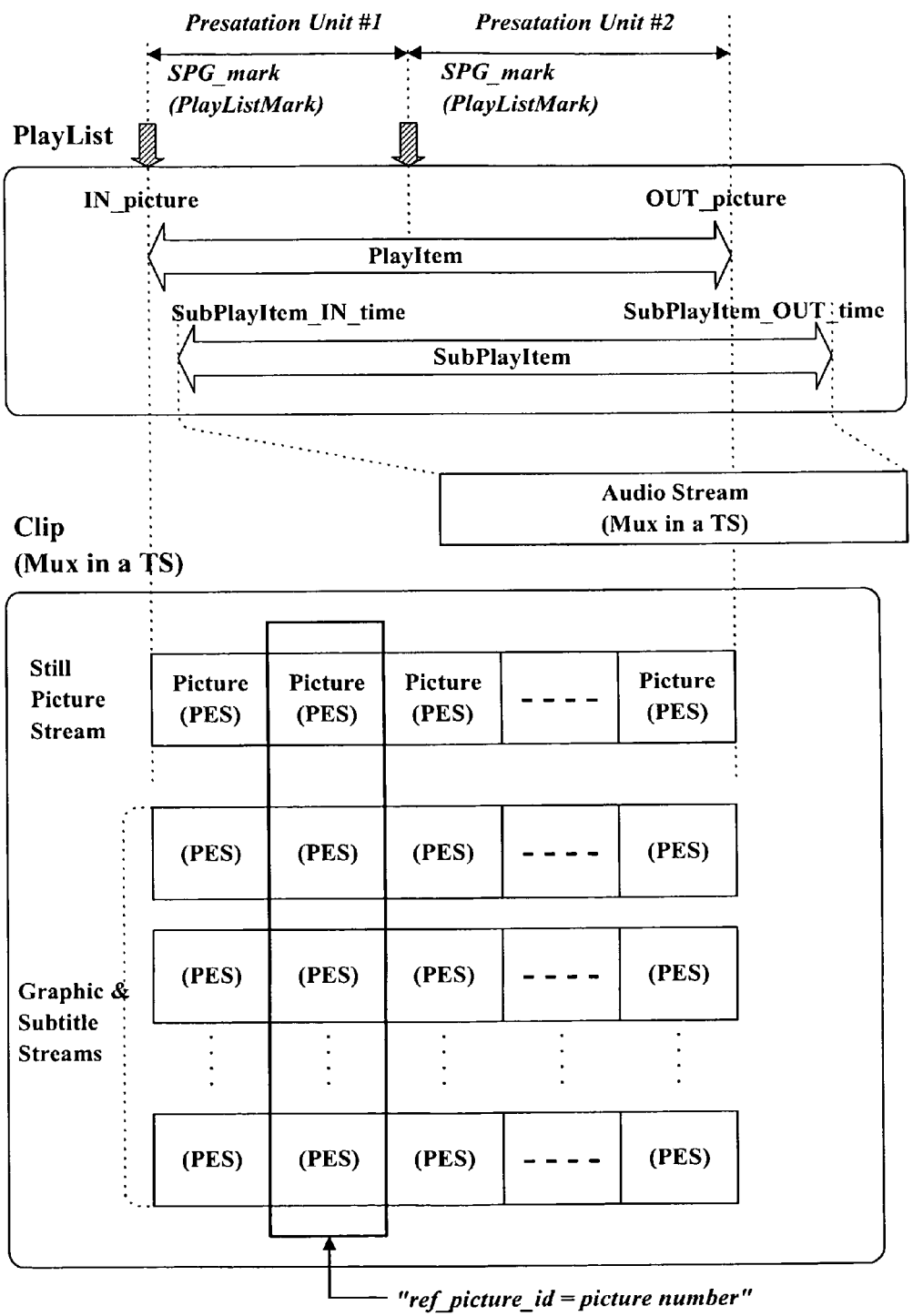
FIG. 5 illustrates an example of the relationship between a playlist and at least one clip file according to an embodiment of the present invention.

FIG. 5 illustrates an example of the relationship between a playlist and at least one clip file according to an embodiment of the present invention. As shown in FIG. 5, the playlist includes navigation information for playback control of a first and second presentation unit (e.g., the first and second presentation unit illustrated in FIG. 4). A playitem included in the playlist is used for playback control of a still picture stream and related data such as graphic & subtitle streams. A sub-playitem included in the playlist is used for playback control of audio data associated with the still image. As shown, the audio data is recorded in a separate file from the still picture and related data, and is therefore not included in the related data. The audio data may be reproduced in either a synchronized or unsynchronized fashion with the associated still images.

The playlist also includes a playlist mark, called hereinafter a still picture group mark (SPG_mark), for each of the presentation units. A still picture group mark SPG_mark points to the beginning of a presentation unit, which includes one or more still images.

The still picture stream and the related data streams (e.g., the graphic & subtitle streams) are packetized into Packetized Elementary Stream (PES) packets on a still image basis. Namely, each PES packet of the still picture stream includes a single still picture. The PES packets are encoded into MPEG2 transport packets and then multiplexed into a transport stream. This will be described in greater detail with respect to the embodiment of FIGS. 6 and 7.

Navigation information for linked reproduction of a still image and graphic & subtitle data associated with the still image is recorded in the PES packets of the still image and the associated graphic & subtitle data. As shown in FIG. 5, a unique picture ID corresponding to the picture number of a still image may be included in the PES packet of the still image and the PES packets of the associated graphic & subtitle.

A reproducing apparatus may effectively perform playback control of still images of presentation units grouped using the still picture group marks (SPG_marks) included in the playlist. Also, the reproducing apparatus performs linked playback of a still image and graphic & subtitle associated with the still image by detecting the unique picture ID of the still image. During reproduction of the still pictures and related data, the reproducing apparatus further reproduces an audio stream indicated by the sub-playitem.

Figure 6:
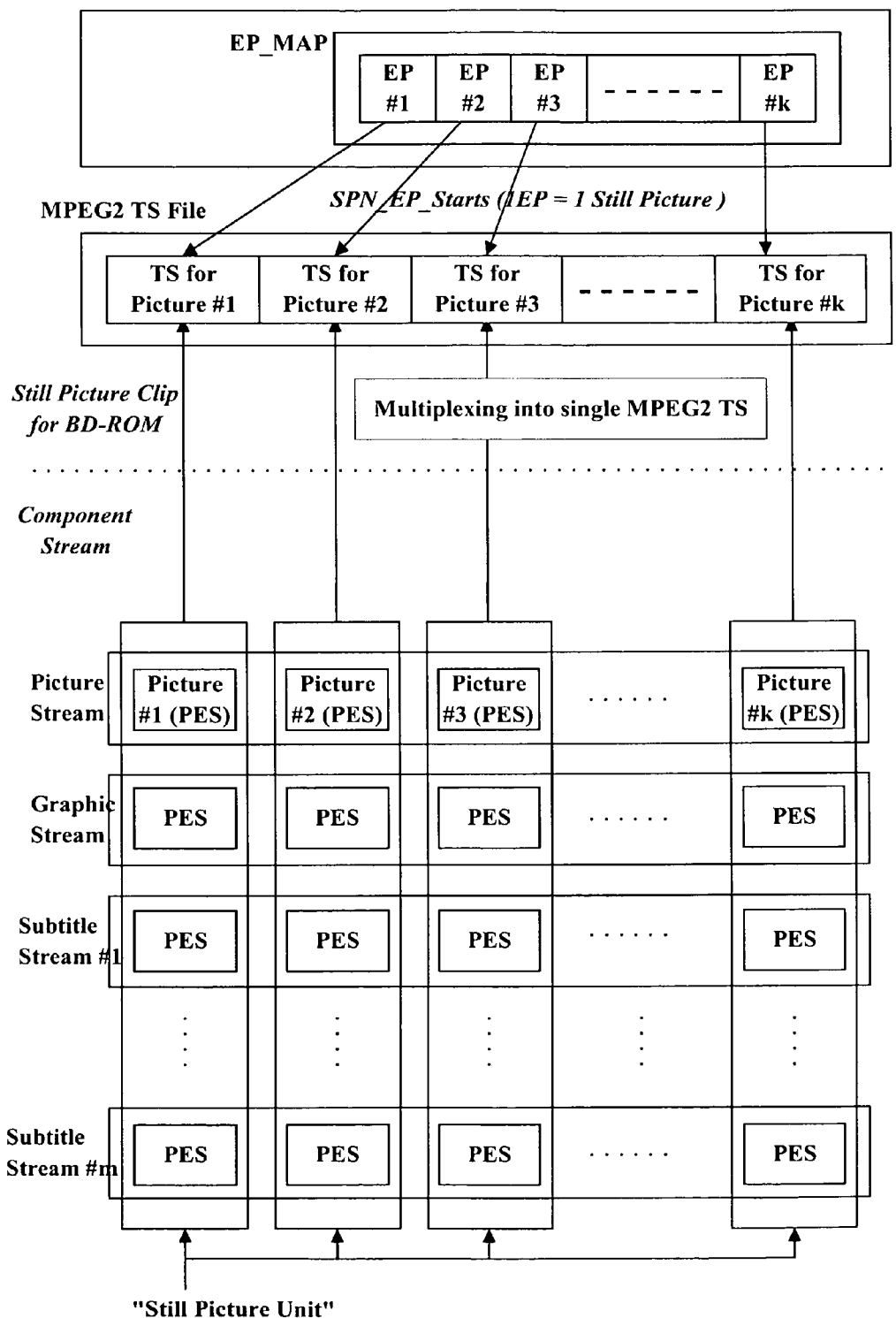
FIGS. 6 and 7 illustrate a detailed embodiment of portions of the data structure in FIG. 1 and a method for managing still images of a high-density recording medium according to the present invention.
Figure 7:
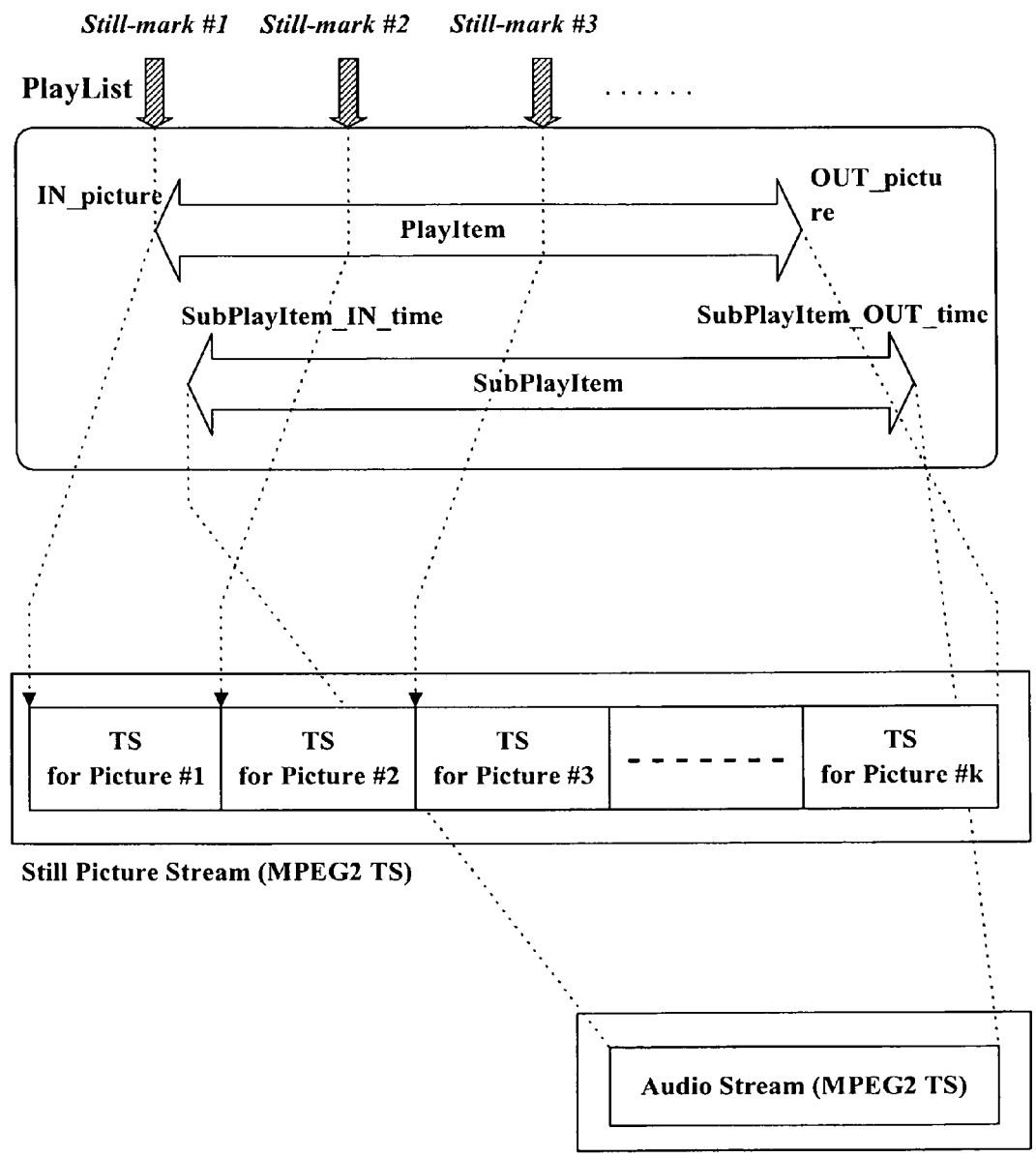

FIGS. 6 and 7 illustrate an embodiment of a data structure and method for managing still images of a high-density recording medium such as a BD-ROM similar to that described above with respect to FIG. 5. The most notable difference being that the embodiment of FIGS. 6 and 7 does not include presentation units.

As shown in FIG. 6, the still picture stream and the related data streams (e.g., the graphic & subtitle streams) are packetized into PES packets on a still image basis. Namely, each PES packet of the still picture stream includes a single still picture, and the associated PES packets of the related data include the related data associated with the still picture (e.g., for reproduction in synchronization with the associated still picture). The still picture together with related data to be reproduced in synchronization therewith are grouped into a still picture unit. On a still picture unit basis, the still picture stream and related data streams are multiplexed into a still picture file of MPEG2 transport streams.

FIG. 6 further shows a clip information file corresponding to the still picture file. The clip information file includes an entry point map (EP_MAP). Individual entry points (EP #1~#k) in the EP map contain respective navigation information for accessing a head recording position of a corresponding still picture unit. The navigation information, for example, includes source packet number entry point start (SPN_EP_Start) information indicating the start recording position of the corresponding still picture unit.

FIG. 7 illustrates a playlist for play control of the still picture file discussed above with respect to FIG. 6. As shown, a playitem (PlayItem) in the playlist contains in-picture (IN_picture) information and out-picture (OUT_picture) information corresponding respectively to the start position and end position of the still images in the still picture file to reproduce. A sub-playitem (SubPlayItem) in the playlist contains sub-playitem in-time (SubPlayItem_IN_time) information and sub-playitem out-time (SubPlayItem_OUT_time) information for a separate audio file to be reproduced in association with the still picture file. The audio data may be reproduced in either a synchronized or unsynchronized fashion with the associated still images.

The playlist further includes a playlist mark, referred to hereinafter as still mark, pointing to each still picture. The presentation duration information for the still picture and related data included in a still picture unit may be recorded in the still mark corresponding to the still picture unit. Alternatively or additionally, the presentation duration information may be contained in the playitem.

The still marks are particularly useful when skipping between pictures during a browsable slideshow. It will further be appreciated that the still picture file or portions thereof can be simultaneously associated with a number of playlists with presentation durations different from each other.

Figure 8:
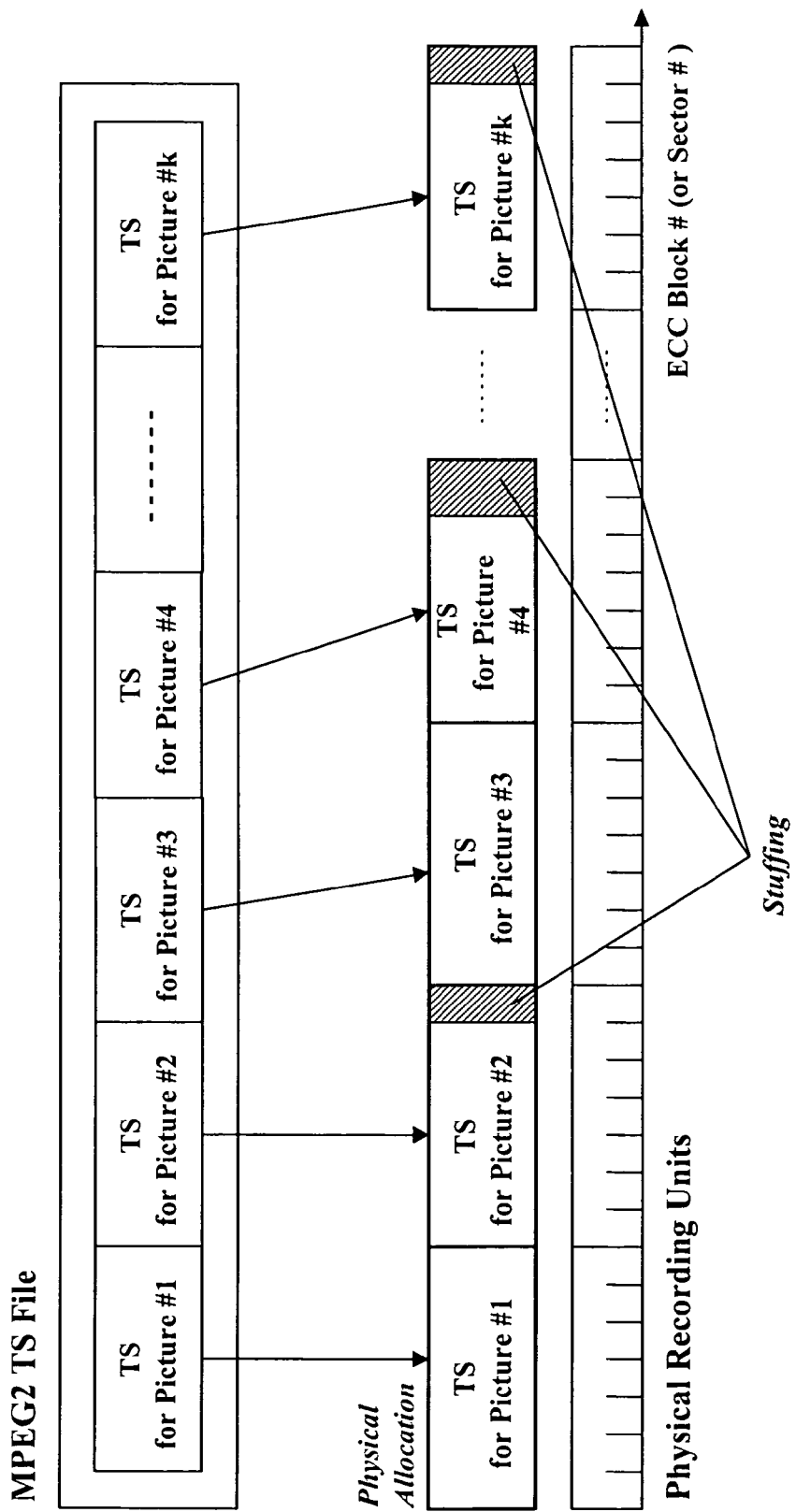
FIG. 8 illustrates physical allocation of transport streams including still picture on a high-density optical disk recording medium.

FIG. 8 illustrates the physical allocation of the MPEG2 transport stream on, for example, an optical disk. As shown, each portion of the MPEG2 transport stream corresponding to a still picture unit is recorded in alignment with a physical recording unit, such as an error correction code block (ECC Block) unit or sector unit, of the optical disk. For example, if the recording size of the transport stream corresponding to a second still picture unit does not fill the physical recording unit, the unfilled region is filled or stuffed with null data.

Figure 9:
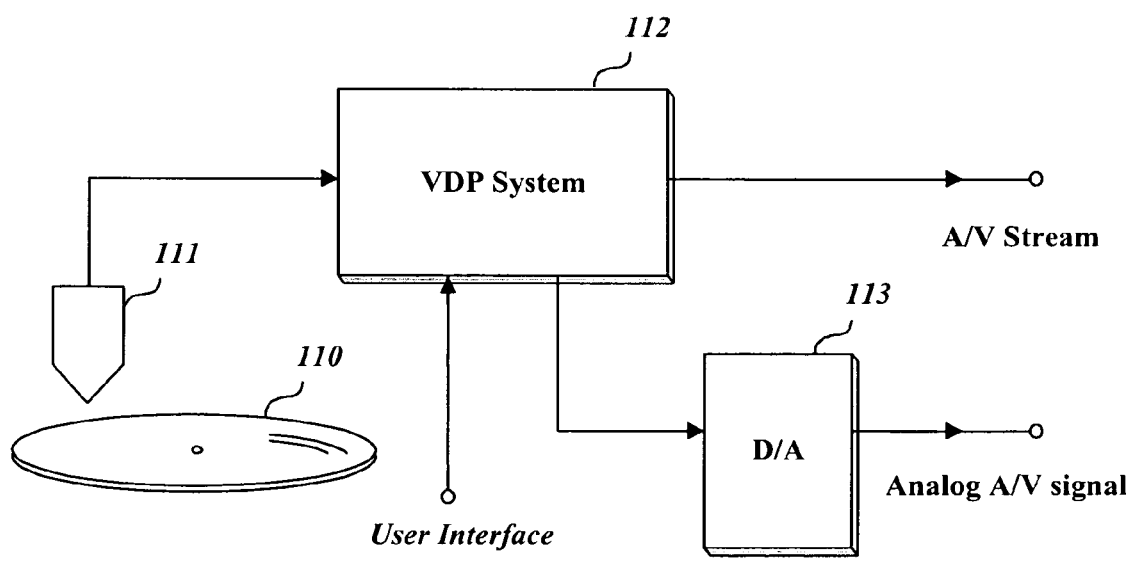
FIG. 9 illustrates a schematic diagram of a partial structure of an optical disc apparatus where the present invention is applied.

FIG. 9 illustrates a schematic diagram of a partial structure of an optical disc apparatus where the present invention is applied. As shown, the optical disc apparatus includes an optical pickup 111 for reproducing data from the an optical disk. A VDP (Video Disc Play) system 112 controls the reproduction operation of the optical pickup 111 and demodulates the data reproduced by the optical pickup 111. The VDP 112 produces an AV stream, which may also be fed to a D/A converter 13 to generate an analog version of the AV stream.

The VDP system 112 controls the optical pickup 111 and demodulates the reproduced data based on user input received from a user interface and the navigation and management information recorded on the optical disk in accordance with the present invention. For example, the VDP system 112 makes reference to still marks included in a playlist and an entry point map included in a clip information file as described above to reproduce a still picture file. Namely, the VDP system 112 reads out a still picture, graphic data, and subtitle data of each still picture unit according to the order of entry points (EP #1, #2, . . . ) recorded in the entry point map. Then, the VDP system 112 conducts a series of operations for reproducing slideshows, which may be reproduced for a fixed time duration according to the presentation duration information included in the still marks or reproduced in the form of skipped reproduction in units of the still picture unit corresponding to each of the still marks according to the key input of the user.

Figure 10:
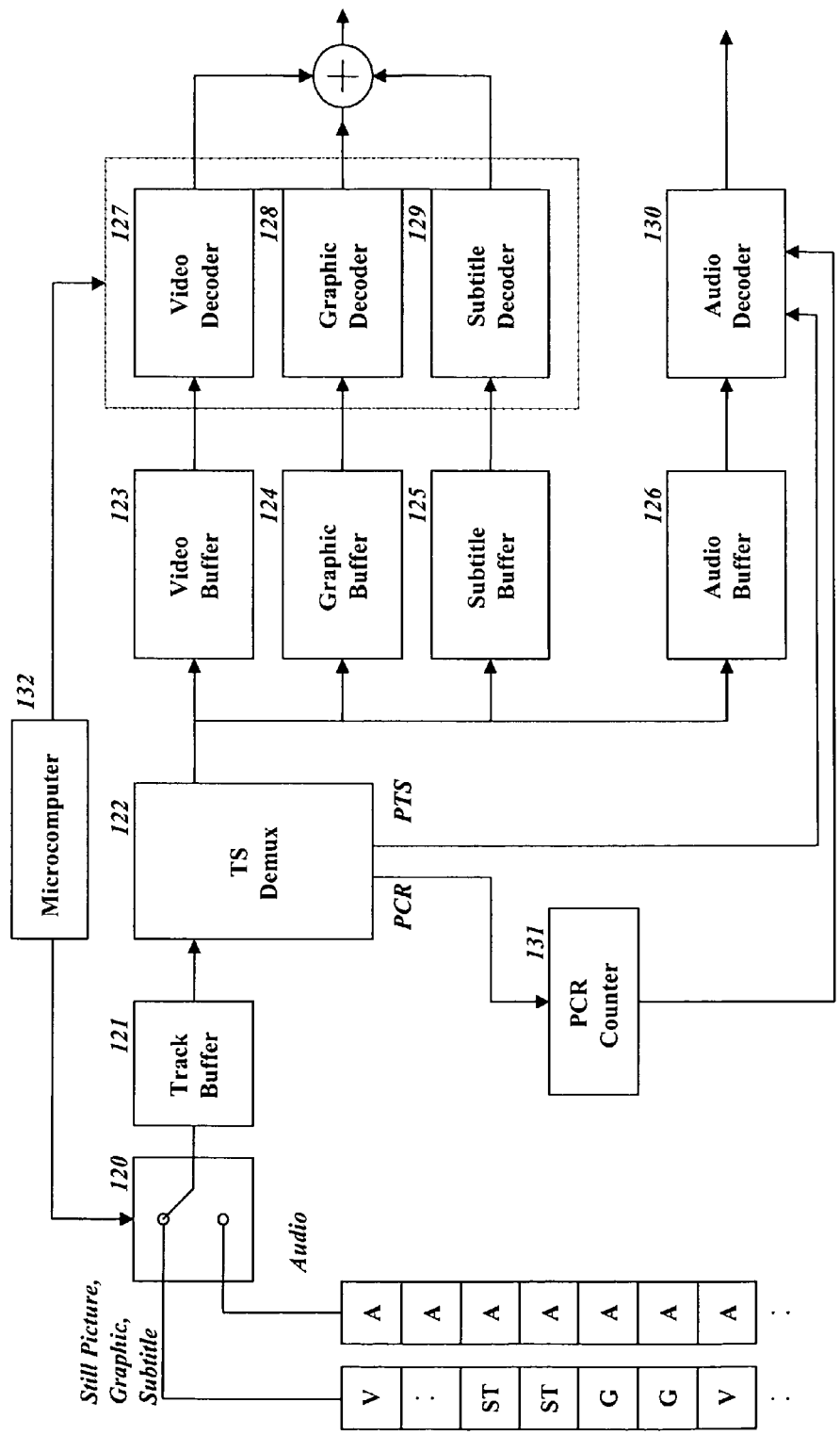
FIG. 10 illustrates a detailed structure of a first embodiment of an optical disc apparatus where the present invention is applied.

As shown in FIG. 10, the VDP system 112 may comprise a switch 120, track buffer 121, TS DEMUX 122, video buffer 123, graphic buffer 124, subtitle buffer 125, audio buffer 126, video decoder 127, graphic decoder 128, subtitle decoder 129, audio decoder 130, PCR counter 131, and microcomputer 132.

The microcomputer 132 controls the operation of the switch 120 according to the key input of a user or presentation duration information, thereby selectively feeding a still picture (V), graphic data (G), and subtitle data (ST) into the track buffer 121. The TS DEMUX 122 makes reference to the packet ID (PID) of the data stream temporarily stored in the track buffer and distributes still picture data, graphic data, and subtitle data into the video buffer 123, graphic buffer 124, and subtitle buffer 125, respectively.

The video decoder 127 decodes the still picture data, the graphic decoder 128 decodes the graphic data, and the subtitle decoder 129 decodes the subtitle data. As a result, a single still picture and related graphic and subtitle data are reproduced.

Similarly, the microcomputer 132 controls the operation of the switch 120 and selectively feeds audio data (A) read out from an optical disc into the track buffer 121. The TS DEMUX 122 makes reference to the packet ID (PID) of the audio data stream temporarily stored in the track buffer, thereby separating the audio data into the audio buffer 126.

The audio decoder 130 decodes and outputs the decoded audio data. At this stage, the presentation time stamp (PTS) information separated by the TS DEMUX 121 is fed into the audio decoder 130. Also, the PCR counter 131 counts a program clock reference (PCR) information separated from the TS DEMUX 121 and the PCR count value is fed into the audio decoder 130. Because the use of PTSs and PCRs is well-known in the art, their inclusion in the data recorded on the optical disk has not been described in detail.

The audio decoder 130 reproduces the audio data when the PCR count value coincides with the PTS value. The PCR count value and PTS value are fed only into the audio decoder 130, thereby controlling the time of audio reproduction.

Accordingly, the optical disc apparatus, by making common use of the switch 120, track buffer 121, and TS DEMUX 122, can normally conduct slideshow operations of reproducing a still picture file and audio file recorded separately in a read-only Blu-ray disc in association with each other.

Figure 11:
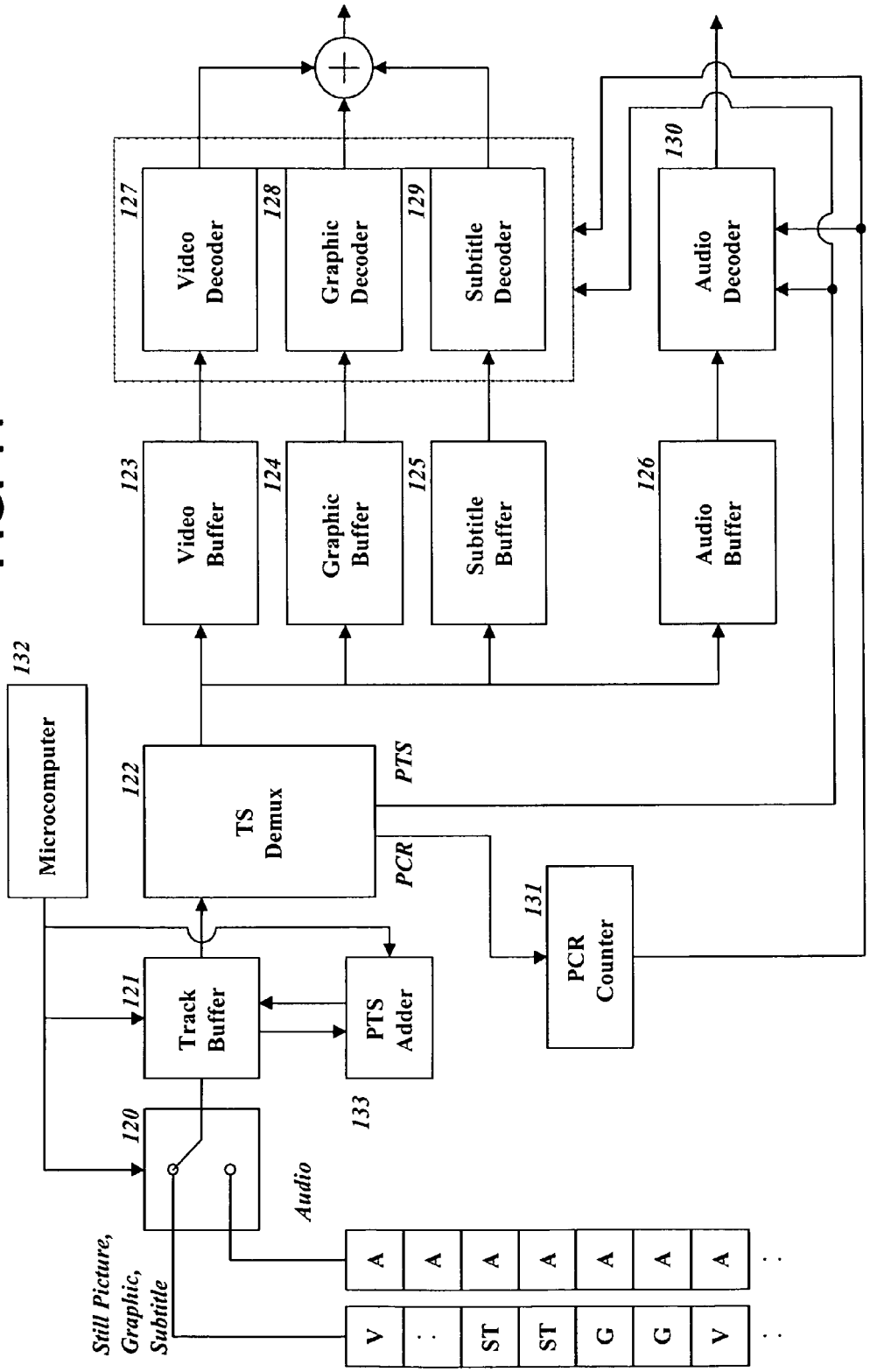
FIG. 11 is a detailed structure of a second embodiment of an optical disc apparatus where the present invention is applied.

FIG. 11 illustrates another detailed embodiment of the VDP system 112. This embodiment is the same as the embodiment of FIG. 10 except for further including a PTS adder 133 and associated connections thereto. As described above, the microcomputer 132 makes reference to the key input of the user or presentation duration information, and thus controls the operations of the track buffer 121 and the switch 120. This same information is used for control of the PTS adder 133.

The PTS adder 133 makes reference to the PTS of the audio data stored temporarily in the track buffer and thus additionally records a pseudo PTS, which is the same as the audio PTS, into the PES packets of the still picture data, graphic data, and subtitle data.

The audio PTS separated from the TS DEMUX 121 is routed to the audio decoder 130, and program clock reference (PCR) information separated from said TS DEMUX is counted by said PCR counter 131. The PCR count value is fed into audio decoder 130, and the audio decoder 130 reproduces the audio data when the PCR count value coincides with the PTS.

The pseudo PTS separated by the TS DEMUX 121 and the PCR count value are also distributed to the video decoder 127, graphic decoder 128, and subtitle decoder 129. When the PCR count value coincides with the pseudo PTS, the still picture data, graphic data, and subtitle data, are respectively reproduced.

Accordingly, the optical disc apparatus, by making common use of the switch 120, track buffer 121, and TS DEMUX 122, can normally conduct slideshow operations of reproducing a still picture file and audio file recorded separately in a read-only Blu-ray disc in association with each other.

Figure 12:
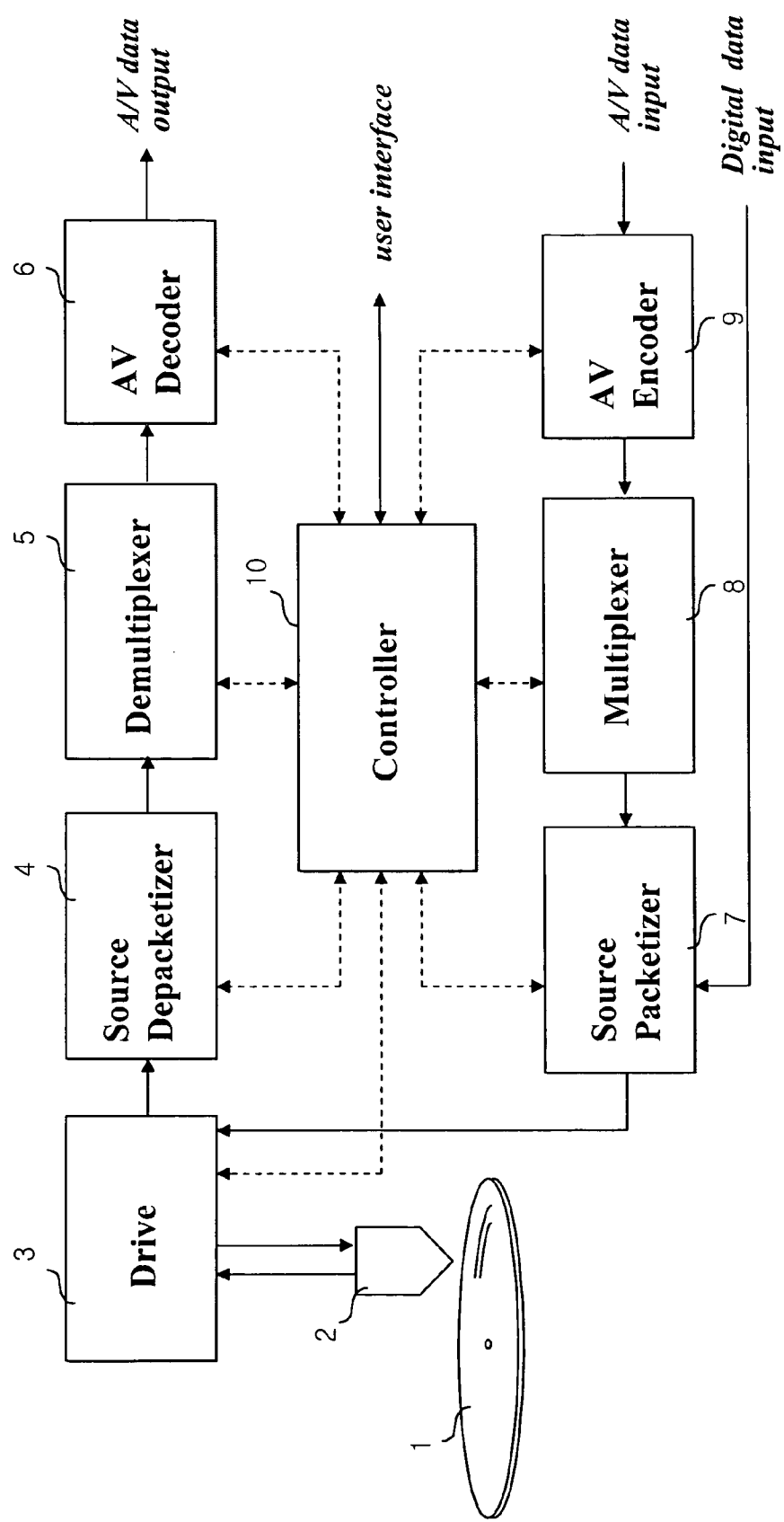
FIG. 12 illustrates another embodiment of a recording and reproducing apparatus according to the present invention.

FIG. 12 illustrates a schematic diagram of an embodiment of an optical disk recording and reproducing apparatus according to the present invention. As shown, an AV encoder 9 receives and encodes data (e.g., still image data, audio data, etc.). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 8, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record one or more of the data structures of FIGS. 1-8 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk. For example, as discussed above with respect to the embodiments of the present invention, a still image or still images may be reproduced in association with audio data based on the navigation information. Furthermore, an image or group of images may be reproduced as a slideshow or portion of a slideshow. As also discussed, a slideshow may be synchronized, browsable, etc.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 12 has been described as a recording and reproducing apparatus, it will be understood that only a recording or only a reproducing apparatus may be provided using those portions of FIG. 12 providing the recording or reproducing function.

As will be appreciated from the forgoing disclosure, the present invention provides a recording medium having a data structure for managing still images recorded on a high-density recording medium (e.g., a high-density optical disk such as a BD-ROM). For example, the data structure allows for displaying still images and possibly audio data in various ways.

The method of managing still images for a high-density recording medium in accordance with the invention provides various still control operations and allows effective linked reproduction of still images along with associated subtitle data or graphic images.

As apparent from the above description, the present invention provides methods and apparatuses for recording a data structure on a high density recording medium for managing still images recorded on the recording medium.

The above description further provides methods and apparatus for reproducing still images recorded on a high density recording medium based on a data structure, also recorded on the high density recording medium, for managing the reproduction of still images.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A non-transitory recording medium having a data structure for managing reproduction of at least one still picture by a reproducing apparatus, comprising:
    a playlist area storing at least one playlist file, the playlist file including at least one playitem and at least one sub-playitem, the playitem indicating an in-point and an out-point of first stream file including presentation data, the sub-playitem indicating an in-point and an out-point of second stream file including audio data; and
    a clip information area storing first clip information file and second clip information file, the first clip information file including a type information indicating a type of the first stream file, the second clip information file including a type information indicating a type of the second stream file,
    wherein the presentation data is divided into a plurality of still picture units, the still picture units including the at least one still picture and associated related data, the related data not including the audio data, and
    wherein the playlist file further includes a playback type indicator, the playback type indicator indicating a type of playback for the at least one playitem, and the type of playback for the at least one playitem being at least one of sequential playback, random playback and shuffle playback.

2. The recording medium of claim 1, wherein the related data includes at least one of graphic data and subtitle data.

3. The recording medium of claim 1, wherein the first clip information file is associated with the first stream file, and the second clip information file is associated with the second stream file.

4. A method of recording a data structure for managing reproduction of at least one still picture on a recording medium, comprising:
    recording at least one playlist file by a recording apparatus, the playlist file including at least one playitem and at least one sub-playitem, the playitem indicating an in-point and an out-point of first stream file including presentation data, the sub-playitem indicating an in-point and an out-point of second stream file including audio data; and
    recording first clip information file and second clip information file by the recording apparatus, the first clip information file including a type information indicating a type of the first stream file, the second clip information file including a type information indicating a type of the second stream file,
    wherein the presentation data is divided into a plurality of still picture units, the still picture units including the at least one still picture and associated related data, the related data not including the audio data, and
    wherein the playlist file further includes a playback type indicator, the playback type indicator indicating a type of playback for the at least one playitem, and the type of playback for the at least one playitem being at least one of sequential playback, random playback and shuffle playback.

5. The method of claim 4, wherein the related data includes at least one of graphic data and subtitle data.

6. The method of claim 4, further comprising:
    recording the first stream file and the second stream file by the recording apparatus, and
    wherein the still picture units being managed by the playitem are reproduced asynchronously and independently from the audio data being managed by the sub-playitem, and the at least one still picture and the associated related data in the still picture units are reproduced synchronously.

7. A method of reproducing a data structure for managing reproduction of at least one still picture from a recording medium, comprising:

reproducing at least one playlist file by a reproducing apparatus, the playlist file including at least one playitem and at least one sub-playitem, the playitem indicating an in-point and an out-point of first stream file including presentation data, the sub-playitem indicating an in-point and an out-point of second stream file including audio data; and reproducing first clip information file and second clip information file by the reproducing apparatus, the first clip information file including a type information indicating a type of the first stream file, the second clip information file including a type information indicating a type of the second stream file, wherein the presentation data is divided into a plurality of still picture units, the still picture units including the at least one still picture and associated related data, the related data not including the audio data, and wherein the playlist file further includes a playback type indicator, the playback type indicator indicating a type of playback for the at least one playitem, and the type of playback for the at least one playitem being at least one of sequential playback, random playback and shuffle playback.

8. The method of claim 7, further comprising:
reproducing the first stream file and the second stream file by the reproducing apparatus, and wherein the still picture units being managed by the playitem are reproduced asynchronously and independently from the audio data being managed by the sub-playitem, and the at least one still picture and the associated related data in the still picture units are reproduced synchronously.

9. The method of claim 7, wherein the recording medium is at least one of a read-only recording medium and a recordable recording medium.

10. An apparatus for recording a data structure for managing reproduction of at least one still picture on a recording medium, comprising:

a pick up configured to record data on the recording medium;

a controller configured to control the pick up to record at least one playlist file, the playlist file including at least one playitem and at least one sub-playitem, the playitem indicating an in-point and an out-point of first stream file including presentation data, the sub-playitem indicating an in-point and an out-point of second stream file including audio data; and the controller configured to control the pick up to record first clip information file and second clip information file, the first clip information file including a type information indicating a type of the first stream file, the second clip information file including a type information indicating a type of the second stream file, wherein the presentation data is divided into a plurality of still picture units, the still picture units including the at least one still picture and associated related data, the related data not including the audio data, and wherein the playlist file further includes a playback type indicator, the playback type indicator indicating a type of playback for the at least one playitem, and the type of playback for the at least one playitem being at least one of sequential playback, random playback and shuffle playback.

11. The apparatus of claim 10, wherein the related data includes at least one of graphic data and subtitle data.

12. The apparatus of claim 10, further comprising:
an encoder configured to encode data;
a multiplexer configured to multiplex the encoded data to create at least one transport stream; and
a source packetizer configured to packetize transport packets into source packets, wherein the controller is configured to control operations of above elements—the pick up, the encoder, the multiplexer and the source packetizer.

13. An apparatus for reproducing a data structure for managing reproduction of at least one still picture from a recording medium, comprising:

a pick up configured to reproduce data from the recording medium;

a controller configured to control the pick up to reproduce at least one playlist file, the playlist file including at least one playitem and at least one sub-playitem, the playitem indicating an in-point and an out-point of first stream file including presentation data, the sub-playitem indicating an in-point and an out-point of second stream file including audio data; and the controller configured to control the pick up to reproduce first clip information file and second clip information file, the first clip information file including a type information indicating a type of the first stream file, the second clip information file including a type information indicating a type of the second stream file, wherein the presentation data is divided into a plurality of still picture units, the still picture units including the at least one still picture and associated related data, the related data not including the audio data, and wherein the playlist file further includes a playback type indicator, the playback type indicator indicating a type of playback for the at least one playitem, and the type of playback for the at least one playitem being at least one of sequential playback, random playback and shuffle playback.

14. The apparatus of claim 13, further comprising:
a source depacketizer configured to depacketize source packets into transport packets;
a demultiplexer configured to demultiplex the transport packets into encoded data; and a decoder configured to decode the encoded data to an original data to be displayed,
wherein the controller is configured to control operations of above elements—the pick up, the source packetizer, the demultiplexer and the decoder.

15. The apparatus of claim 13, wherein the recording medium is at least one of a read-only recording medium and a recordable recording medium.

* * * * *